(12) United States Patent
Freeman et al.

(10) Patent No.: US 7,224,797 B2
(45) Date of Patent: May 29, 2007

(54) SYSTEM AND METHOD FOR HYBRID CONDITIONAL ACCESS FOR RECEIVERS OF ENCRYPTED TRANSMISSIONS

(75) Inventors: Martin Freeman, Palo Alto, CA (US); Jin Lu, Croton-On-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 09/932,069

(22) Filed: Aug. 17, 2001

(65) Prior Publication Data
US 2003/0035540 A1 Feb. 20, 2003

(51) Int. Cl.
*H04N 7/167* (2006.01)
(52) U.S. Cl. .................. 380/201; 380/200; 380/210
(58) Field of Classification Search ........ 380/200–204, 380/272–282, 210
See application file for complete search history.

(56) References Cited

U.S. PATENT DOCUMENTS

| 5,699,104 A | 12/1997 | Yoshinobu | 348/5.5 |
| 5,742,680 A | 4/1998 | Wilson | 380/16 |
| 5,862,219 A | 1/1999 | Glaab | 380/20 |

FOREIGN PATENT DOCUMENTS

| EP | 0 506 435 | 9/1992 |
| EP | 0570785 A1 | 11/1993 |
| EP | 0 585 833 | 3/1994 |
| EP | 0585833 A1 | 3/1994 |
| EP | 0 752 635 | 1/1997 |
| WO | WO9307715 | 4/1993 |

OTHER PUBLICATIONS

Embedded core test generation using broadcast test architecture and netlist scrambling Jiang, J.H.; Jone, W.-B.; Shih-Chieh Chang; Ghosh, S.; Reliability, IEEE Transactions on vol. 52, Issue 4, Dec. 2003 pp. 435-443.*
Cypress: compression and encryption of data and code for embedded multimedia systems Lekatsas, H.; Henkel, J.; Chakradhar, S.T.; Jakkula, V.; Design & Test of Computers, IEEE vol. 21, Issue 5, Sep.-Oct. 2004 pp. 406-415.*
Secure Communication in an Embedded Environment Khater, M.A.; Amro, M.H.; Laban, A.A.; Soudan, B.; Information and Communication Technologies, 2006. ICTTA '06. 2nd vol. 2, Apr. 24-28, 2006 pp. 2583-2588.*

* cited by examiner

*Primary Examiner*—David Jung

(57) ABSTRACT

A system for decrypting transmissions encrypted by a transmission station includes a receiver having a first conditional access module embedded within the receiver, and a second conditional access module that is removable from the receiver. The first conditional access module decrypts a first signal transmitted by the transmission station and the second conditional access module decrypts a second signal transmitted by the transmission station. The first and second signals are encrypted by separate conditional access modules. The transmission station provides the receiver with an entitlement code for allowing the receiver to decrypt the transmission upon verification by the transmission station that the receiver is entitled to decrypt the transmission.

11 Claims, 3 Drawing Sheets

SYSTEM AND METHOD FOR HYBRID CONDITIONAL ACCESS FOR RECEIVERS OF ENCRYPTED TRANSMISSIONS

BACKGROUND OF THE INVENTION

1. Field of the Invention

The present invention relates to the decryption of encrypted transmissions, and more particularly to a system, a device and a method for providing hybrid conditional access for receivers of encrypted transmissions.

2. Description of the Related Art

Providers of cable television (CATV) service transmit a signal to subscribers via a cable. The signal contains multiple channels distributed within the frequency range of the signal. The CATV service providers typically encrypt their transmission signals for preventing non-subscribers from utilizing the signals. In order for the subscriber's TV or VCR to utilize the signal, a means must be provided for receiving the signal, decrypting the signal, and selecting a channel. The means provided is typically a device, known as a set-top box. The set-top box is connected to a cable for receiving the signal transmitted by the CATV service provider. The set-top box is further connected to the subscriber's TV or VCR for providing a signal, which is ready for display. The set-top box typically provides a navigation function and a security function. The navigation function is for navigating and selecting channels within the received signal. The security function is for decrypting the received signal. The security function of the set-top box is part of a conditional access (CA) system for determining the entitlements of the subscriber's set-top box to the services provided by CATV service provider.

According to laws mandated by the FCC, the navigation function must be kept separate from the security function. This has typically been accomplished by set-top boxes having either a separate permanent security function embedded within the set-top boxes, or a separate removable security function in the form of a smart card that interfaces with the set-top box.

There are disadvantages to providing a set-top box with only an embedded security function. The security function in the set-top box is fixed. When critical features within the control access system are changed, the security function in the set-top box becomes non-functional. For example, cable service providers may periodically change the encryption method used, and may offer or require different levels of entitlement to certain channels to their subscribers. In order to accommodate a change in entitlement or encryption method, a new set-top box with a different security function is required to replace the original one. Furthermore, each set-top box has to be custom made as specified by the CATV service provider, thus incurring high manufacturing costs.

Providing the set-top box with a removable security function provides the ability to change the security function of the set-top box without having to replace it. Furthermore, a standard set-top box could be used for a variety of CATV service providers, thus lowering manufacturing costs. However, there are disadvantages to providing a set-top box with only a removable module providing the security function. Upon absence or disengagement of a removable module the set-top box overrides the navigating function and is unable to decrypt any of the received transmissions. Without the removable module the set-top box is only able to show content that is not encrypted—content that is not of high value.

EP Application Number 0 585 833 A1, entitled Video Signal Decoder System discloses a set-top box for decoding video signals in which the box includes two security function modules: an embedded security function module and an interchangeable smart card security function module which interfaces with the box. However, the disclosed box has a number of disadvantages. Upon receiving a signal, decryption is performed by one of the security function modules. The security function module is selected by the box via a trial and error method. The embedded security function module is tested first for selection, and the smart card is tested second. The security function module of either the embedded security function or the smart card security function that is selected depends on which has a decryption algorithm that corresponds to the encryption algorithm of the received signal. Thus, the selection of one security function module to perform decryption is made according to the signal received by the box, with the other security function module being disabled. The box thus does not provide a default security function module. The box does not allow different levels of access to the received transmission.

U.S. Pat. No. 5,742,680 discloses a set-top box for providing decryption of a received signal, wherein the signal is sent by a selected transmitter from a plurality of transmitters, and the decryption is performed by a corresponding smart card of a plurality of smart card security function modules. The box does not include an embedded security function module. Without a corresponding smart card for the signal selected, the set-top box cannot perform decryption.

In the aforementioned references, any holder of a smart card can use the smart card with any compatible set-top box. However, providers of transmitted signals often find it to their advantage to restrict decryption of their signals to the set-top box belonging to the subscriber. Furthermore, the aforementioned references do not provide for checking of entitlement to decrypt the transmitted signals. Nor do they disable security functions modules that are no longer entitled. In order to prevent non-entitled decryption, providers of signal transmissions must change the encryption algorithm of the transmitted signals. This would require distribution of new smart cards to all entitled customers.

EP Application 0 570 785 A1 discloses a method for allowing decryption of transmitted signals at defined geographic locations, using smart cards. However, to accomplish this the above method requires transmission of at least two data channels to be received by at least two separate processors.

SUMMARY OF THE INVENTION

It is an object of the present invention to provide a receiver for receiving and decrypting encrypted transmissions from a transmission station, in which the receiver has a default embedded security function module and a removable security function module for providing an additional level of access to the transmissions, and wherein the default mode is operational, regardless of the availability of the removable security function module.

It is another object of the present invention to provide a system and a method for providing access to encrypted transmissions from a transmission system by a receiver, in which the receiver is allowed various levels of access to the transmissions, including a default level.

It is a further object of the present invention to provide a system and a method for providing access to encrypted transmissions from a transmission system by a receiver in accordance with entitlements of one of the user and the receiver to the transmissions.

It is a further object of the present invention to provide a system and method for providing a receiver and security function modules, which are efficient to manufacture and distribute while providing maximum service.

To achieve the above objects, a system for receiving and decrypting encrypted transmissions from a transmission station in accordance with the present invention includes a receiver, receiving the transmissions, having selectable first and second security function modules and an initialization module. The first security function module is embedded within the receiver and provides a default decryption mode in which a first signal of the transmission is decrypted. The second security function module is removable from the receiver and decrypts a second signal of the transmission. Upon selection of a security function module, the initialization module initializes the receiver to decrypt the received signal with the selected security function module and to inform the transmission station of the selection. The system further includes separate security function modules residing in a head-end of the transmission station that encrypt the first and second signals. The transmission station verifies entitlements of the receiver to receive the first or second signals, and provides the receiver with an entitlement code allowing the selected security function module of the receiver to decrypt the corresponding signal.

The present application also discloses a method for decrypting encrypted transmissions transmitted from a transmission station to a receiver, comprising the steps of: transmitting a transmission by the transmission station; receiving a first signal of the transmission; decrypting the first signal by a first security function module embedded within the receiver; enabling a second conditional access module interfaced to the receiver; discontinuing decryption of the first signal by the first security function module; receiving a second signal of said transmission at the receiver; and decrypting the second signal by the second conditional access module.

The present invention also generally provides a system for decrypting encrypted transmissions of at least a first signal and a second signal. The system comprises a receiver for receiving transmissions of the at least first signal and second signal. The receiver has a first embedded conditional access module for decrypting the first transmitted signal, and a second removable conditional access module for decrypting the second transmitted signal. Enabling the second conditional access module causes the second conditional access module to override the first conditional module.

The present invention also generally comprises a transmission station for transmitting encrypted transmissions to a receiver. The transmission station comprises at least one head-end having a first conditional access module for encrypting a first signal and a second conditional access module for encrypting a second signal. The head-end further comprises an entitlement module for determining whether a receiver has the right to decrypt the second signal. Upon a positive determination by the entitlement module, the transmission station transmits an entitlement code to the receiver that allows the receiver to decrypt the second signal.

Therefore, a need exists for a system in which a receiver receives and decrypts a transmission transmitted by a transmission station, the receiver having, both, an embedded security function module and a removable security function module. There exists a need for the embedded security function module to provide a default mode, so that transmissions from the transmission station can be decrypted at a default level regardless of the availability of the removable security function module. There exists the need for providing varying levels of access to transmissions. There exists a need for preventing users, who do not have entitlements, from viewing restricted transmissions, without requiring the permanent disablement of existing security function modules.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION OF THE PREFERRED EMBODIMENT

Figure 1:
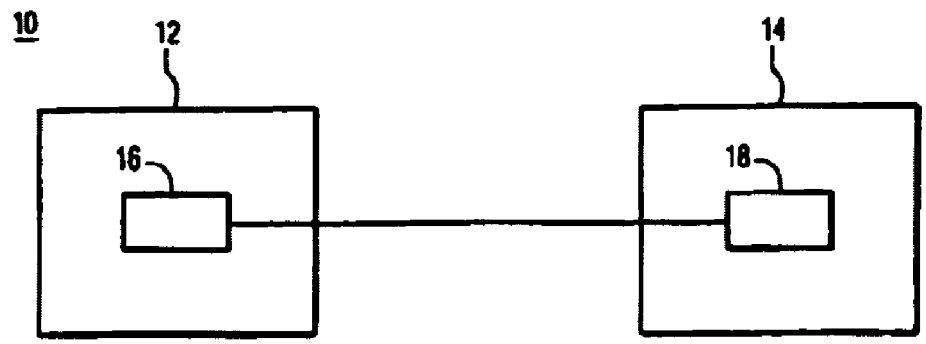
FIG. 1 is a block diagram of a prior art system for decryption by a receiver of an encrypted signal transmitted by a transmission station of a CATV service provider.

Turning now to the drawings, in which like reference numerals identify similar or identical elements throughout the several views, a prior art system for the decryption of encrypted transmissions transmitted by a transmission station is depicted in FIG. 1.

Referring to FIG. 1, the prior art system, shown at 10, includes a transmission station, having head-end 12, transmitting a signal to a receiver 14. The transmission station is typically a cable television (CATV) service provider. The receiver 14 is typically a set-top box. A cable, through which the transmission is transmitted, runs between the set-top box and the transmission system. The set-top box is further in communication with a TV or VCR for viewing the transmissions once they are received and decrypted. A security system, known as a conditional access (CA) system, is provided for securing the transmission from being accessed by a receiver that does not have entitlements. The CA system of the system shown in FIG. 1 is comprised of CA module 16 and CA module 18. CA module 16 is located in the head-end of the transmission station. CA 16 encrypts contents of the signal for transmission, while CA 18 decrypts the received signal for viewing. CA 18 is embedded within the set-top box as a permanent component.

Figure 2:
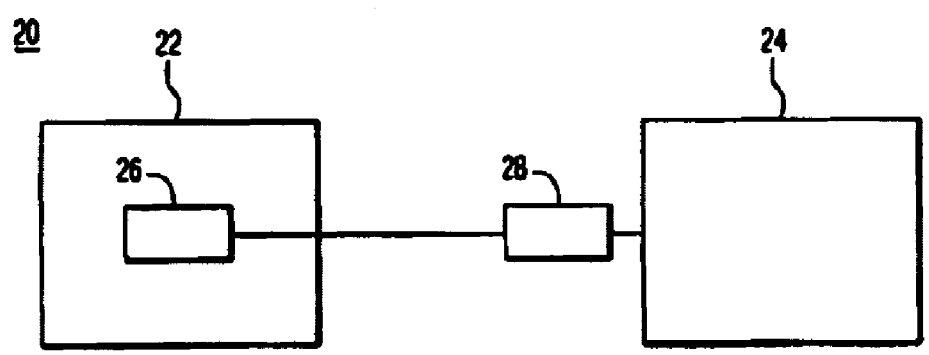
FIG. 2 is a block diagram of second prior art system for decryption by a receiver of an encrypted signal transmitted by a transmission station of a CATV service provider.

Another prior art system is depicted in FIG. 2. The prior art system 20 shown includes head-end 22 and set-top box 24. CA module 26 is located in head-end 22, and CA module 28 is located in set-top box 24. CA module 28 is a removable smart card. CA module 28 can be exchanged for a different smart card.

Figure 3:
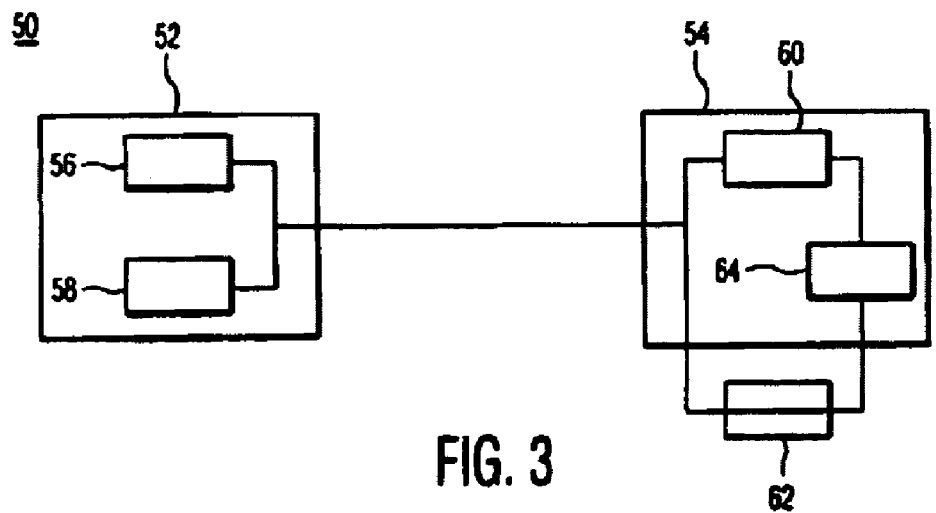
FIG. 3 is a block diagram of a system for decryption by a receiver of an encrypted signal transmitted by a transmission station in accordance with the present invention.

Referring now to FIG. 3, an embodiment of the system of the present invention is shown. The system 50 of the present invention provides a transmission station having head-end 52 and a set-top box 54. The set-top box 54 receives a transmission from a transmission station 52 via cables or via wireless means such as airwaves received by a satellite dish antenna. The transmission station 52 transmits two signals. A first CA module 56 encrypts the first signal. A second CA module 58 encrypts the second signal.

The set-top box provides a hybrid conditional access architecture comprising an embedded CA module 60, and a removable CA module 62 for decrypting the signals transmitted by the transmission station. The set-top box is provided with a standard interface into for engaging CA module 62 and interfacing it with the set-top box.

In operation, initially, the set-top box receives the signals from the transmission station, encrypted by CA module 56, and decrypts the first encrypted signal via embedded CA module 60. CA module 60 provides a default conditional access capability for decrypting the transmission from the transmission station, even when a removable module is not enabled or is not available.

Upon enabling CA module 62, a reinitialize unit 64 resets the set-top box by reinitializing the set-top box to allow CA module 62 to decrypt the received transmission, instructs the set-top box 54 to transmit a change signal message to the transmission station 52, and discontinues decryption of the first signal by CA module 60. The change signal message informs the transmission station that the set-top box 54 is ready to decrypt the second signal.

The head-end of transmission station 52, upon receiving the change signal message, determines whether or not the set-top box is entitled to receive the second signal. The determination is made according to criteria set by the managers of the transmission station, such as whether or not the owners of the set-top box have paid subscription dues for the service provided by the transmission station, as recorded in a database.

Upon a positive determination, the head-end transmits an entitlement code, which will enable the set-top box to decrypt the second signal. Upon the set-top box 54 receiving the second signal with the entitlement code, the CA module 62 proceeds to decrypt the second signal.

In the set-top box of the preferred embodiment the removable CA module 62 is a standard module providing for efficient manufacturing and distribution. This is advantageous for handling upgrades, security changes and new products.

Figure 4:
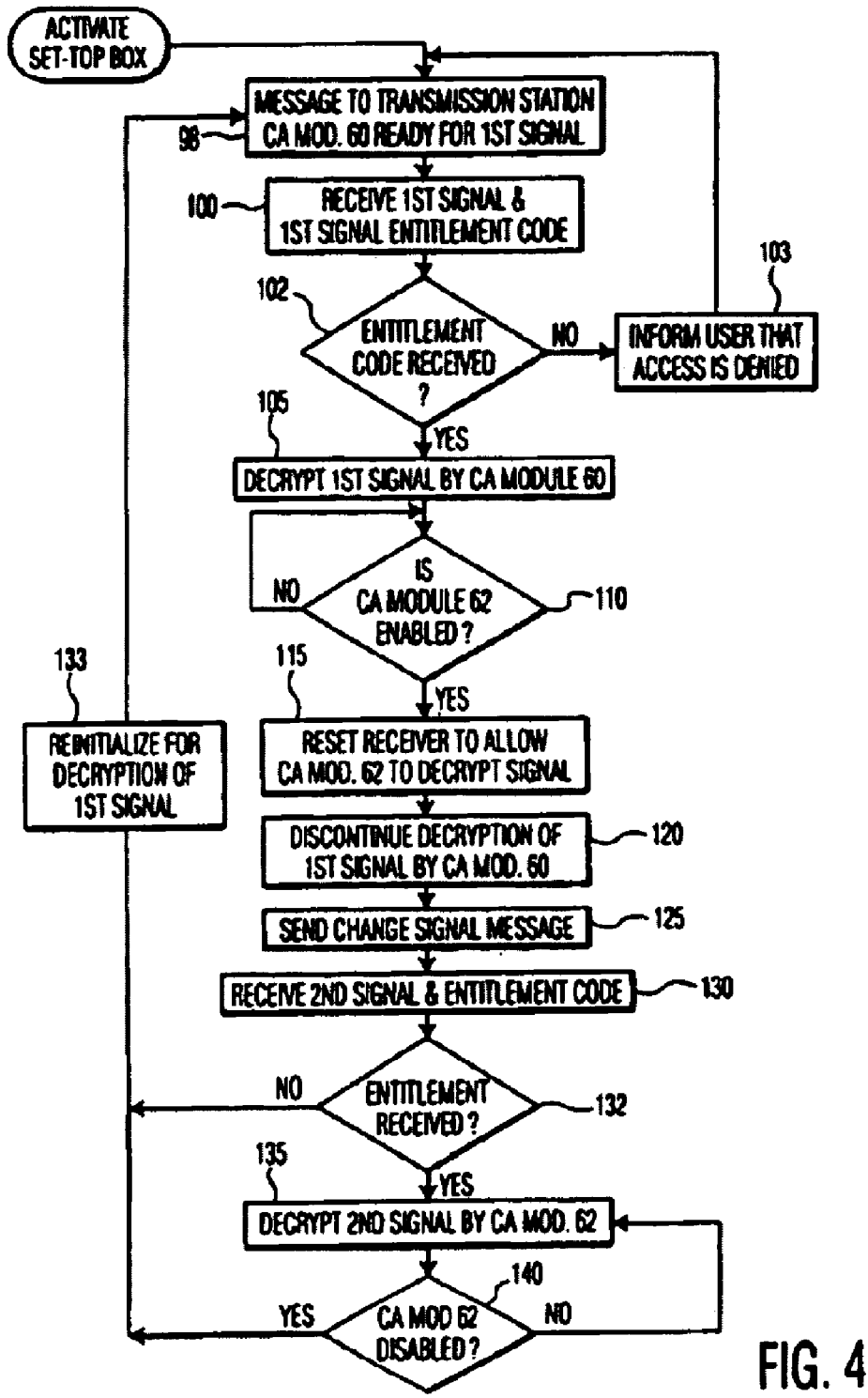
FIG. 4 is an exemplary flowchart illustrating the steps performed by a receiver of decrypted transmissions in accordance with the present invention.
Figure 5:
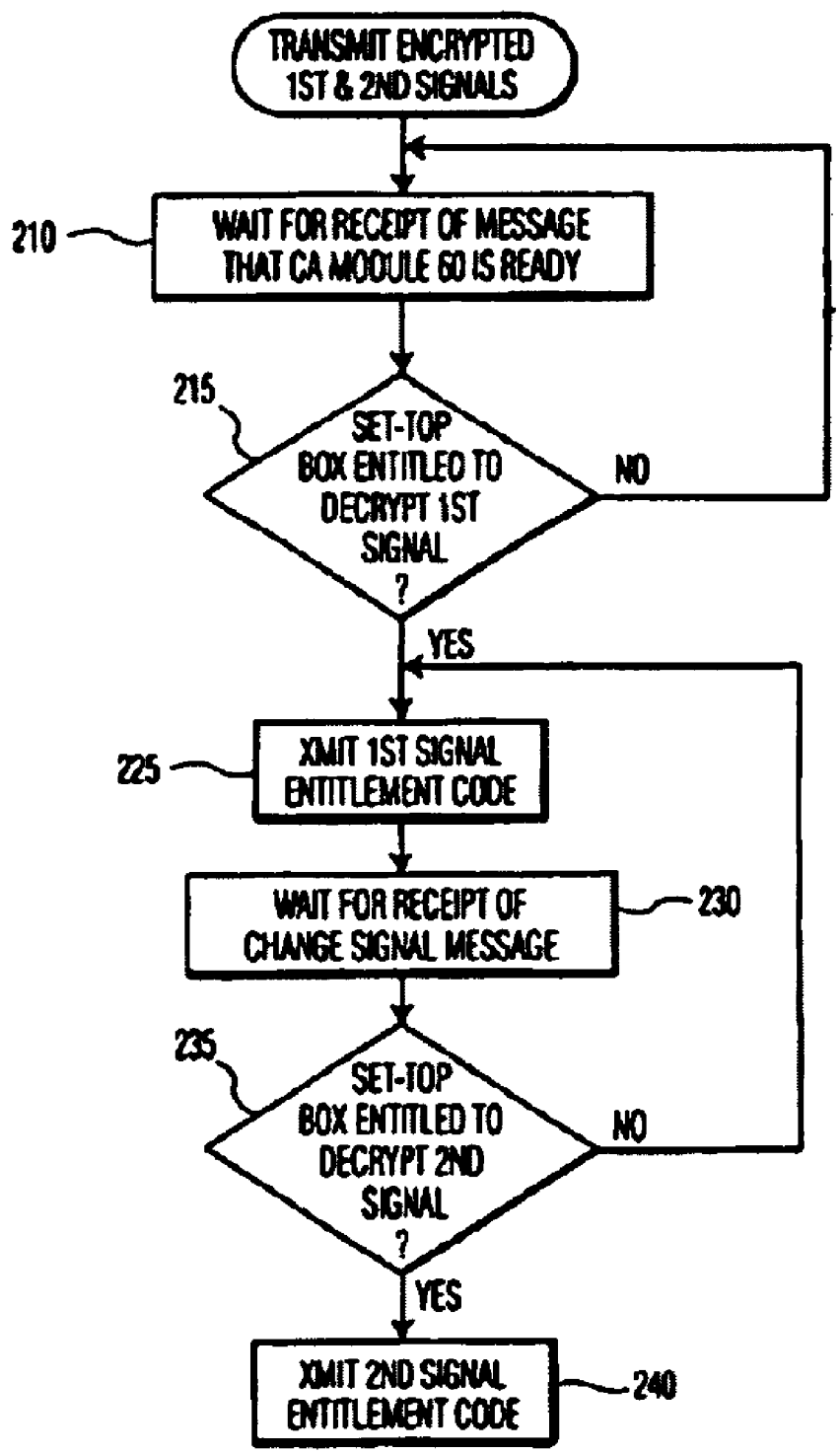
FIG. 5 is an exemplary flowchart illustrating the steps performed by a transmitter of encrypted transmissions in accordance with the present invention.

FIGS. 4 and 5 are exemplary flowcharts depicting the steps performed by the set-top box and the transmission station of an embodiment of the invention, respectively. It is to be understood that modifications could be implemented according to preference, design choice, etc.

With reference to FIG. 4, the steps performed by the set-top box will now be described. At step 98, upon activating the set-top box 54 to receive transmissions, the set-top box 54 sends a message to the transmission station to inform the transmission station that the CA module 60 of the set-top box 54 is ready to decrypt the first signal.

At step 100 the set-top box receives the transmissions. In the preferred embodiment, the first signal is received together with an entitlement code for the first signal. The first signal entitlement code allows the set-top box to receive the first signal. In another embodiment the entitlement code provides key data to allow the set-top box to decrypt the signal. In yet another embodiment, the entitlement code allows both of the above functions.

At decision step 102 it is determined whether or not the first signal entitlement code was received. If not, the first signal cannot be decrypted and control goes to step 103 to inform the user of the set-top box that he is not entitled to view any signals and that access is denied. The process then returns to step 98.

Upon determination that the first signal entitlement code was received the process moves to step 105. At step 105, the first signal is decrypted by CA module 60. At decision step 110, the set-top box determines whether or not CA module 62 has been enabled. In operation, CA module 62 can be enabled in a variety of ways, such as by inserting the removable module or by activating a switch, once inserted. If CA module 62 is not enabled, the set-top box continues to receive and decrypt the first signal and the process returns to step 110. If CA module 62 has been activated, the process moves to step 115.

At step 115, the set-top box is reset. An initialization routine is performed to allow CA module 62 to decrypt the received signal. At step 120 decryption of the first signal by CA module 60 is discontinued. At step 125 the set-top box transmits a change signal message to the transmission station to inform the transmission station that CA module 62 has been selected and is ready to decrypt the second signal. The order of performance of steps 115-125 can be rearranged as per design choice.

At step 130, the set-top box receives the entitlement code for the second signal from the transmission station, if authorized. At decision step 132, it is determined whether or not the second signal entitlement code for the second signal was received. If not, the second signal cannot be decrypted and the process goes to step 133 for reinitializing the set-top box to decrypt the first signal, and informing the transmission station that the set-top box is ready to decrypt the first signal.

Upon determination that the second signal entitlement code was received in step 132, the process moves to step 135. At step 135, CA module 62 decrypts the second signal. At step 140, a determination is made as to the whether or not CA module 62 is still enabled. Decryption of the second signal continues until CA module 62 is disabled. Upon disablement of CA module 62, the set-top box discontinues decrypting the second signal, and the process goes to step 133 for reinitialization to receive and decrypt the first signal.

Next, with respect to FIG. 5, the steps performed by the transmission station will now be described. While continually transmitting encrypted first and second signals, the transmission station waits, at step 210, for receipt of a message that CA module 60 is ready to decrypt the first message.

Upon receipt of the message at step 210, the process moves to decision step 215. At step 215, the transmission station determines whether or not the set-top box is entitled to decrypt the first signal. If not, the process returns to step 210. According to design choice, a routine may be alternatively performed using a variety of steps. For example, the routine may send a message to the set-top box to inform the user that he is not entitled to view the contents of the transmissions, after which the process returns to step 210. Also, Steps 210 and 215 can be combined into one step, in which only messages received from set-top boxes having current entitlements are recognized. If, at step 215, it is confirmed that the set-top box is entitled to decrypt the first signal, the process passes to step 225.

At step 225, a first signal entitlement code is transmitted to the set-top box. The first signal entitlement code allows the set-top box to decrypt the first signal. The first signal entitlement code, in one embodiment, is an address corresponding to the set-top box that is attached as a prefix to the transmission of the first signal, in order to allow the set-top box to receive the first signal. In another embodiment, the first signal entitlement code contains a key, which allows CA module 60 to use a decryption algorithm, which corresponds to the encryption algorithm, used by CA module 56. In yet another embodiment, the first signal can be received and decrypted by any set-top box in communication with the transmission station, without requiring verification of entitlement. Upon completion of step 225, the process passes to step 230.

Step 230 is a wait step, in which the transmission station waits for receipt of a change signal message from the set-top box stating that CA module 60 will no longer decrypt the first signal and that CA module 62 is ready to decrypt the second signal. Upon receipt of a change signal message, the process passes to step 235. At decision step 235, the transmission station verifies that the set-top box is entitled to decrypt the second signal. Upon verification, the process passes to step 240.

At step 240, the transmission station transmits a second signal entitlement code to the set-top box. The second signal entitlement code allows the set-top box to decrypt the second signal. The second signal entitlement code functions in a similar manner to the first signal entitlement code.

If it was determined that the set-top box is not entitled to decryption of the second signal, the process returns to step 225. Alternatively, a routine may be performed according to design choice. For example, the routine may have a step for sending a message to the set-top box for informing the user that they are not entitled to view the contents of the second signal, and then, the process may be returned to step 225 for allowing the set-top box to decrypt the first signal for viewing.

In the embodiment depicted in FIGS. 4 and 5, it is preferred that the set-top box receive and decrypt the first signal prior to being allowed to receive and decrypt the second signal. In another embodiment, the system and method may be modified to allow the user of the set-top box to initially select either CA module 60 for decryption of the second or CA module 62 for decryption of the second signal. In one possible modification, the transmission station verifies entitlement of the set-top box to decrypt transmissions from the transmission station before allowing CA module 62 to decrypt the second signal. This limits the use of the removable CA module 62 to use with set-top boxes, which belong to paid-up subscribers. In another modification, entitlements are verified individually for each of CA modules 60, 62, so that the removable CA module 62 can be used in any compatible set-top box, regardless of the entitlements associated with the set-top box.

In another embodiment, CA module 60 provides a basic access level, and CA module 62 provides additional access levels, but does not provide the basic access level. When CA module 62 is enabled, CA modules 60, 62 together provide the full range of access levels. For example, a transmission is provided in which a transport stream includes a video stream and two audio streams. One audio stream is in English and the other audio stream is in Spanish. CA module 60 is able to decrypt the English audio stream only, while CA module 62 is able to decrypt the Spanish audio stream only. Prior to inserting CA module 62 into the receiver, viewers can only hear the English language, providing the viewers with a default access. Upon inserting CA module 62 into the receiver viewers can choose from both languages, providing the viewers with premium access.

As suggested above, while the embodiments have used a "first signal" and a "second signal", these may represent first and second packages each comprising multiple signals. For example, a first package of signals may correspond to basic cable channels and a second package of signals may correspond to a package of premium cable channels. The cable provider may make available a number of different second or premium packages. Each such package would have a particular removable CA module that decrypts the signals for that package.

In addition, the receiver may have more than one port for receiving a number of removable CA modules. Each such removable module may receive a separate "second signal" as described above, in other words, a third, fourth, etc. signals. Each such removable module may have a distinct decryption algorithm and authorizing decryption may be analogous to the processing and signal exchange with the transmission station described above. In addition, a priority scheme for enabling one of the embedded CA module and the multiple removable CA modules, while disabling the others, may be devised. For example, the ports in the receiver for the removable CA modules may be configured such that only the removable module for a certain cable package may be plugged therein. If multiple modules are plugged in, the highest level premium channel authorized by the transmission station may be enabled while all others are disabled.

It is contemplated that the determination of entitlement rights be omitted for rights to decrypt either of the signals as desired by the management of the transmission station. The determination of entitlement rights depicted in FIGS. 4 and 5 is merely exemplary, and a different method could be implemented in accordance with the objectives of the management of the transmission station.

It is contemplated that CA module 62 may comprise a plurality of removable modules, each removable module providing a different level of access to the transmission station and that CA module 60 is removable and interchangeable while still providing a default mode.

It is further contemplated that the transmission station transmit one signal, wherein the embedded and removable CA modules provide different levels of access to the same signal. Thus, for example, the system may be for decrypting encrypted transmissions of at least one signal. The system may comprise a receiver for receiving transmissions of the at least one signal. The receiver has a first embedded conditional access module and a second removable conditional access module for decrypting received transmissions. Enabling of the second conditional access module causes the second conditional access module to override the first conditional access module. The first embedded conditional access module and the second removable conditional access module may have different decryption algorithms. Where a single signal is received, the first conditional access module may be capable of decrypting only certain aspects of the signal (such as a "preview" of a premium broadcast), whereas the decryption algorithm of the second removable conditional access module may be capable of decrypting the entire signal, thus allowing viewing of the premium broadcast itself. Thus, when the second removable conditional access module is enabled, the viewer will see the premium broadcast.

It is further contemplated that the transmission station transmits more than two signals, while the set-top box receives transmissions from more than one transmission station.

It is further contemplated that the transmission station transmits signals via any available medium and that the signal may be any type of signal for which encryption is desired.

While the present invention has been described in detail with reference to the preferred embodiments, they represent mere exemplary applications. Thus, it is to be clearly understood that many variations can be made by anyone having ordinary skill in the art while staying within the scope and spirit of the present invention as defined by the appended claims.

What is claimed is:

1. A system for decrypting encrypted transmissions of at least a first signal and a second signal, comprising:
a receiver for receiving transmissions of the at least first signal and second signal at the same time, the receiver having a first embedded conditional access module for decrypting the first transmitted signal, and a second removable conditional access module for decrypting the second transmitted signal;
wherein enabling of the second conditional access module causes the second conditional access module to override the first conditional module.

2. The system according to claim 1, wherein a first decryption algorithm is used by the first conditional access module and a second decryption algorithm is used by the second conditional access module, the first and second decryption algorithms being different from each other.

3. The system according to claim 2, wherein the receiver comprises at least one additional removable conditional access module, each additional removable conditional access module having a different decryption algorithm from each other and from the second removable conditional access module.

4. The system according to claim 3, wherein an enabling of one or more additional removable conditional access modules causes overriding of the first conditional module and also causes overriding of all but one of the second and additional removable conditional access modules.

5. The system according to claim 1, wherein the first signal as received by the receiver is encrypted with a first encryption algorithm and the second signal as received by the receiver is encrypted with a second encryption algorithm.

6. The system according to claim 1, wherein the second conditional access module requires receipt of a transmitted entitlement code for permitting decryption of the second signal.

7. The system according to claim 1, wherein the first conditional access module is a default conditional access module.

8. The system according to claim 1, wherein the second conditional access module is enabled by inserting it into the receiver.

9. The system according to claim 1, wherein the receiver comprises a standard interface for engaging the second conditional access module and interfacing the second conditional access module to the receiver.

10. The system according to claim 1, wherein the receiver further comprises an initialization module for initializing the receiver to decrypt the second signal upon enabling of the second conditional access module.

11. The system according to claim 10, wherein the system further comprises a transmitter that, after initializing the receiver to decrypt the second signal, the initialization module causes the transmitter to transmit a signal indicating that the receiver is ready to receive the second signal.

* * * * *